Figure 1:
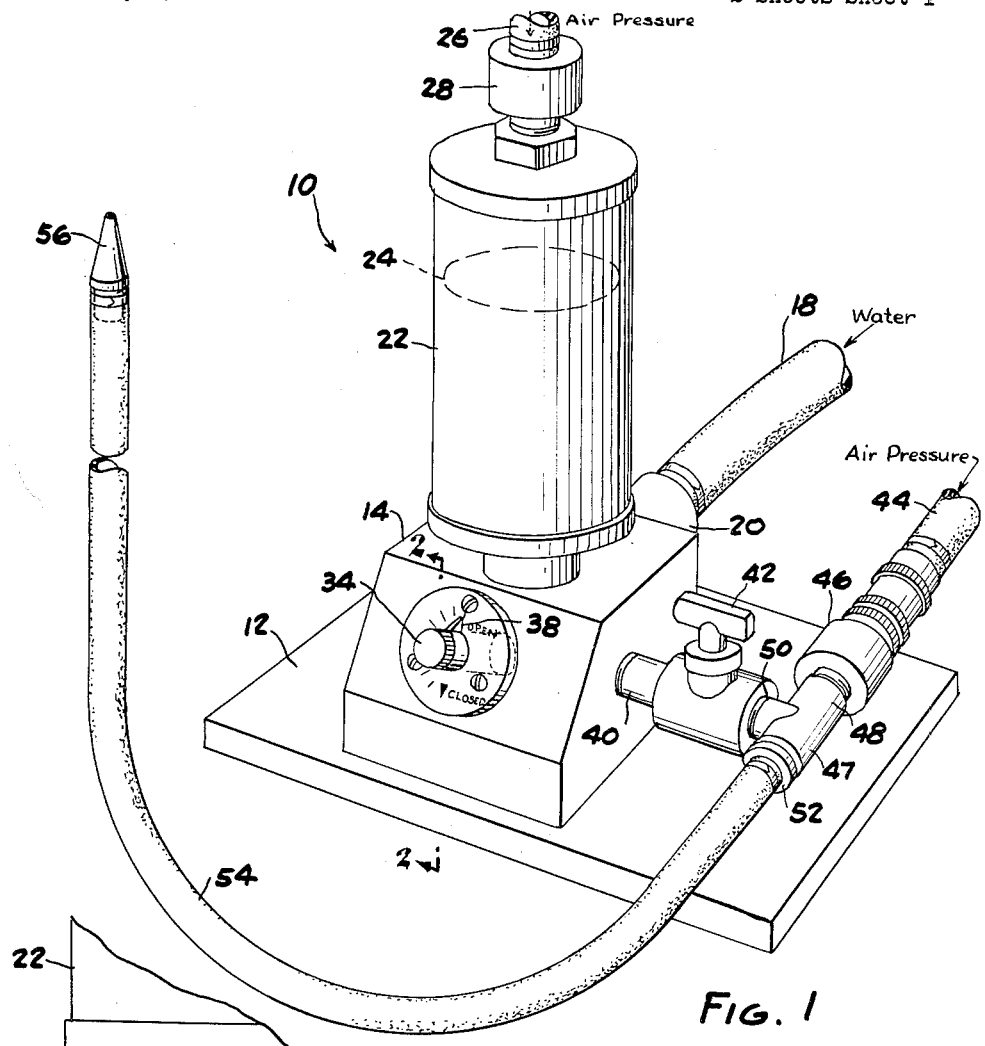

April 3, 1962

D. MILSTEAD 3,027,625

MIST COOLANT SYSTEM

Filed May 1, 1959

2 Sheets-Sheet 1

INVENTOR.
DARRELL MILSTEAD
BY
Clifford L. Sadler
ATTORNEY

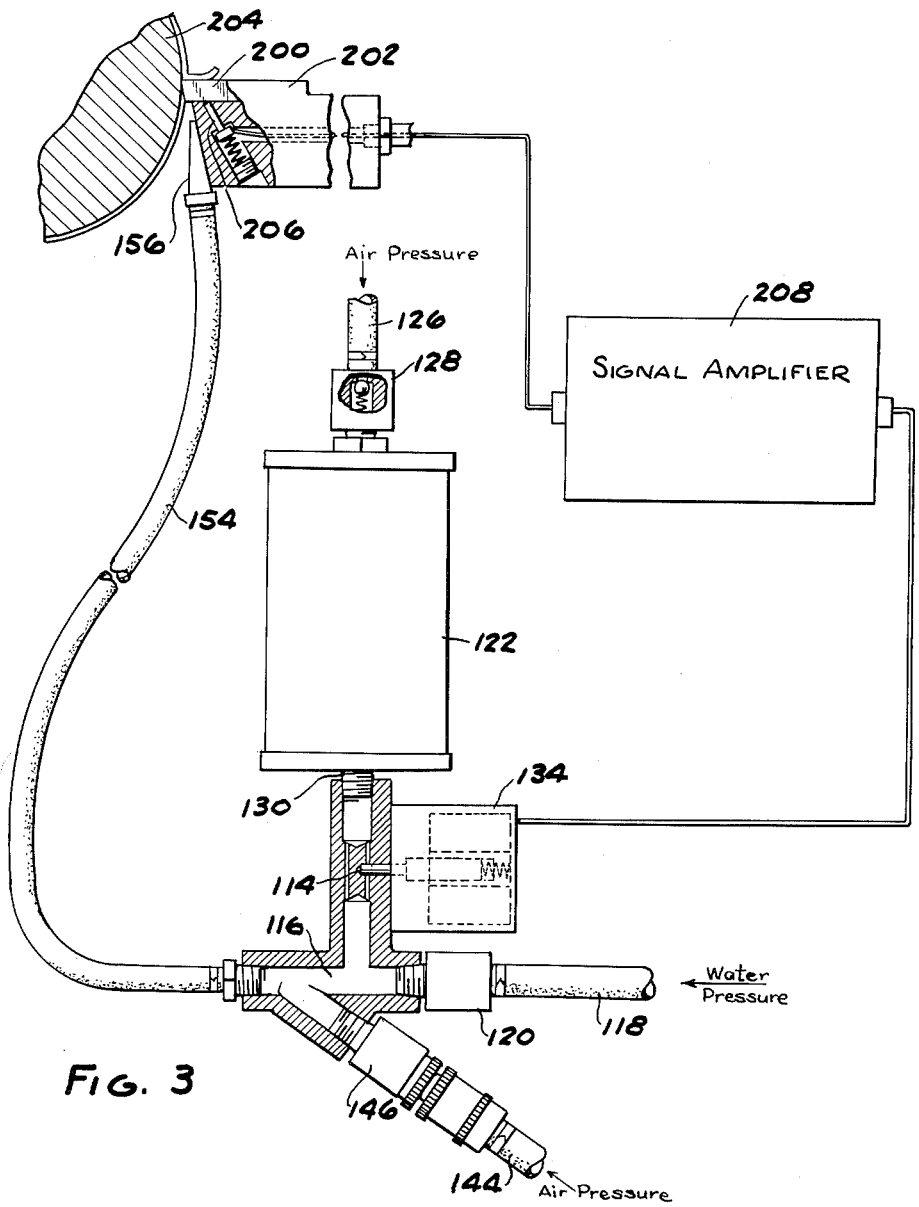

3,027,625
MIST COOLANT SYSTEM
Darrell Milstead, Walkerton, Ind., assignor to Curtiss-Wright Corporation, South Bend, Ind., a corporation of Delaware
Filed May 1, 1959, Ser. No. 810,481
1 Claim. (Cl. 29—106)

The present invention relates to mist coolant systems and more particularly to systems for supplying a cooling mist to cutting tools and grinding wheels of metal processing machines.

It has long been common to employ coolant liquids for the cooling of cutting tools and grinding wheels when forming metal parts. Without a coolant the temperature of the cutting tool would become excessively high, causing rapid wearing of the cutting edge. As the tool becomes dull, friction increases and the wear becomes ever increasing. The cutting fluids employed are usually a solution of water and concentrated coolant. The concentrated coolant is usually either a soluble synthetic or natural oil which tends to lubricate the cutting action, resulting in a decrease in heat caused by friction. The ratio of water to undiluted oil to form the cooling liquid is highly variable and dependent upon the type of metal working being done and the condition of the cutting tool or grinding wheel. For grinding operations the ratio may be as high as 50 to 1 and for boring, tapping, and milling the ratio of water to oil may be as low as 10 to 1.

With known systems presently in use it is necessary to prepare batches of coolant liquid having the desired concentration ratio needed to perform a specified job. Because of the practical limitations, these batches are usually made up in sufficient quantities to run the tool machine for a limited time. By way of example, it is common to make sufficient amounts of coolant liquid to supply a machine for only an eight hour work shift.

Once a batch is made up, the percentage concentration of undiluted oil is established and the ratio cannot be easily changed, even though such a change may be in order to secure optimum tool life. Tests have been conducted which show that as a tool dulls the percentage of oil in the coolant liquid should be increased and that with such an increase in percentage of oil in the coolant liquid, normal tool life can be extended up to 300 percent of that usually encountered when the coolant liquid is of a constant concentration ratio.

In view of the foregoing state of the art, it is an object of the present invention to provide a coolant system for metal processing operations which will eliminate the preparation of coolant liquid batches and will permit an instantaneously variable ratio of coolant water to oil.

It is another object of this invention to provide a coolant system for metal processing machines which will have an infinitely variable water-to-oil ratio.

It is still another object of the present invention to provide a mist coolant system for a cutting machine which is automatically responsive to the temperature of the cutting tool to provide varying concentrations of coolant liquid.

Figure 2:
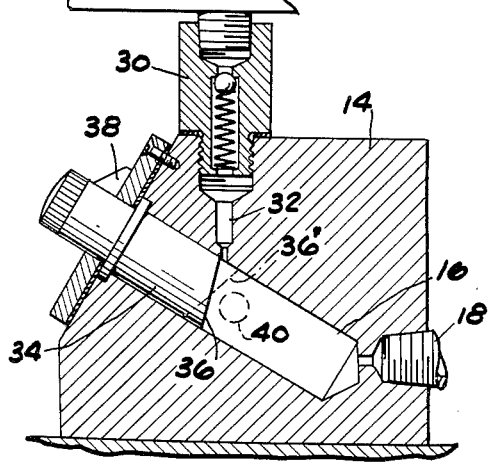

These and other objects of the present invention will become apparent from the following description and the accompanying drawings in which:

FIGURE 1 discloses a perspective view of a manually variable mist coolant system, FIGURE 2 discloses a sectional view taken along section lines 2—2 of FIGURE 1, and FIGURE 3 is a diagrammatical representation of a modification of the invention disclosed in FIGURE 1 having an automatically adjustable mist coolant system.

Referring now to the drawings wherein like reference numerals identify like parts, a mist coolant system 10 is disclosed in FIGURE 1. This system provides a mist of coolant liquid to the cutting surface of a cutting tool. It should also be appreciated that with minor modifications within the scope of the present invention a coolant system of the flushing type may be provided rather than the mist system disclosed herein. While the present invention is described herein as being associated with a metal processing operation of the cutting type, it is equally adaptable to processes of other types, such as grinding.

Mounted on a base 12 is a mixing valve 14 which contains a mixing chamber 16 therein. Connected directly to the mixing chamber 16 is a conduit 18 for supplying water. This may usually be obtained from the conventional pressurized water system. A common check valve 20 is provided in conduit 18 to prevent a back flow in the event of a failure of water pressure.

Mounted over the valve 14 is a small tank 22 which contains the undiluted synthetic or natural soluble oil. Dotted line 24 indicates a hypothetical level of that oil. The tank 22 is connected at its upper end to an air pressure line 26 which has interposed therein a check valve 28. Thus the oil within the tank 22 is contained under pressure. The bottom of the tank 22 has a check valve 30 affixed thereto to assure an exit flow of fluid only.

Check valve 30 provides an attaching fitting which is threadably received into the body of the mixing valve 14. Internal passage 32 provides a means of communication between the undiluted soluble oil tank 22 and the chamber 16 of the mixing valve 14. A valve element 34 is rotatably mounted in one end of the chamber 16. It is provided with a biased lower end 36 so that it may be rotated to either open or close off the exit of passageway 32. As indicated by a pointer 38, mixing valve 14 is shown in the drawing in its full open position. When the valve element 34 is turned a full 180°, the biased end 36 will seal off conduit 32 as indicated by dotted line 36'. The status of the valve is disclosed by the relationship of the pointer 38 and the indicia "Open" and "Closed," as seen in FIGURE 1.

In operation, air pressure through conduit 26 forces undiluted oil into mixing chamber 16 in an amount dependent upon the position of valve element 34, where it is mixed with water from conduit 18. Air pressure from conduit 26 is controlled to be of slightly higher order than the pressure of water entering through conduit 18. Thus the oil from tank 22 and water from conduit 18 are mixed within the chamber 16.

An outlet 40 extends from the side of the mixing chamber 16 through which the mixed oil and water will pass. A master valve 42 is provided in conduit 40 to control the quantity of flow and flow pressure of the liquid leaving chamber 16.

A second air line 44 having a check valve 46 is provided. A T-shaped fitting 47 with an inlet 48 from the air pressure line 44 and an inlet 50 from the water-oil conduit 40 is also provided. Fitting 47 has a single outlet 52 and functions to atomize the water-oil coolant liquid. A flexible conduit 54 carries the cooling liquid mist and air to a nozzle 56 which is pointed directly at the cutting action which is to be controlled.

With the apparatus of the foregoing description the ratio of water to undiluted oil can be controlled by the angular position of valve element 34. Thus a ratio of relatively high order may be employed when a cutting tool is fully sharpened, and then the percentage of oil in the coolant liquid may be increased gradually by rotating the valve element 34 as the tool wears and friction tends to increase. The mist coolant system 10 permits an infinitely variable means for mixing soluble oil and water that can be adjusted during a cutting operation and from one machining operation to another as might be demanded.

A modification of the present invention is disclosed in FIGURE 3 where an automatic means for varying the percentage of cutting oil in the coolant liquid is disclosed. This modification employs a tank 122 containing the undiluted cutting oil and is pressurized by means of an air pressure conduit 126 operating through a check valve 128. Outlet 130 of tank 122 is controlled by a solenoid actuated valve 114 which has a solenoid 134 responsive to the temperature of the cutting tool, as will be described. The undiluted oil from tank 122 enters a mixing chamber 116 that is fed with water from a conduit 118 having a check valve 120. Compressed air enters through a conduit 144 having a check valve 146. The resultant combination of cutting oil, water, and air is delivered as a mist through a flexible conduit 154 to a nozzle 156 which is directed to the carbide tip 200 of a cutting tool 202. It will be noted from the drawing that the tip 200 is performing a cutting operation on a work piece 204.

The cutting tool 202 contains a temperature sensing element 206 which delivers a signal proportional to the temperature of the tip 200 to a signal amplifier 208. The amplifier 208 delivers the tool tip temperature information in a manner to control the solenoid 134.

During the operation of the system described in FIGURE 3, a coolant mist is directed at the tool tip 200. As changes in the condition of the work piece 204 or the dulling of the cutting edge of the tip 200 increase friction, the corresponding increase in temperature of tip 200 will be transmitted as a signal by means of the sensor 206 through the amplifier 208 to the solenoid 134, which in turn will open the valve 114 to cause a greater percentage of cutting oil to enter the mixing chamber 116. Thus an increase in cutting tool temperature will cause the percentage of oil in the coolant liquid to increase, which in turn will cause the friction of the tool on the work piece to be reduced, such operation all taking place automatically.

It should be appreciated that the modification of the invention disclosed in FIGURE 3 could also be made responsive to the cutting effort instead of temperature.

As the tool tip becomes dull, the cutting effort will increase. This increase in effort will be noted by an increase in current flow to the motor of the cutting machine. The solenoid 134 could be made responsive to the current flow.

Other modifications of the present invention will become apparent to those skilled in the art which will come within the scope and spirit of this invention as defined in the following claim.

I claim:

A mist coolant system for cutting machine tools comprising: a reservoir for cutting tool lubricant having means connected thereto for pressurizing lubricant received therein, a source of water under less pressure than said lubricant, a mixing chamber having passage means connecting said reservoir and water source thereto and an outlet provided at one end thereof, check valve means provided within said passage means between said reservoir and said mixing chamber and preventative of water flow to said reservoir, temperature sensing means including means for being held in engagement with a cutting tool, valve means provided within said mixing chamber for the controlled restriction of said reservoir passage means, said valve means having said temperature sensing means operatively connected thereto, a source of air under pressure connected across the outlet end of said mixing chamber and including conduit means provided between the outlet side of said mixing chamber and said cutting tool for the reception of the water and lubricant mixture formed in said mixing chamber and dispersion thereof to said tool.

References Cited in the file of this patent

UNITED STATES PATENTS

| 1,036,173 | Arey | Aug. 20, 1912 |
| 1,185,888 | Durham | June 6, 1916 |
| 2,743,134 | Smith | Apr. 24, 1956 |

FOREIGN PATENTS

| 788,032 | Great Britain | Dec. 18, 1957 |